Aug. 6, 1940.  J. MORRIS, JR  2,210,684

CURRENT COLLECTING DEVICE

Filed Sept. 30, 1939  2 Sheets-Sheet 1

WITNESSES:
Edward Michaels
F. V. Giolma

INVENTOR
Joshua Morris, Jr.
BY
ATTORNEY

Aug. 6, 1940.   J. MORRIS, JR   2,210,684
CURRENT COLLECTING DEVICE
Filed Sept. 30, 1939   2 Sheets-Sheet 2
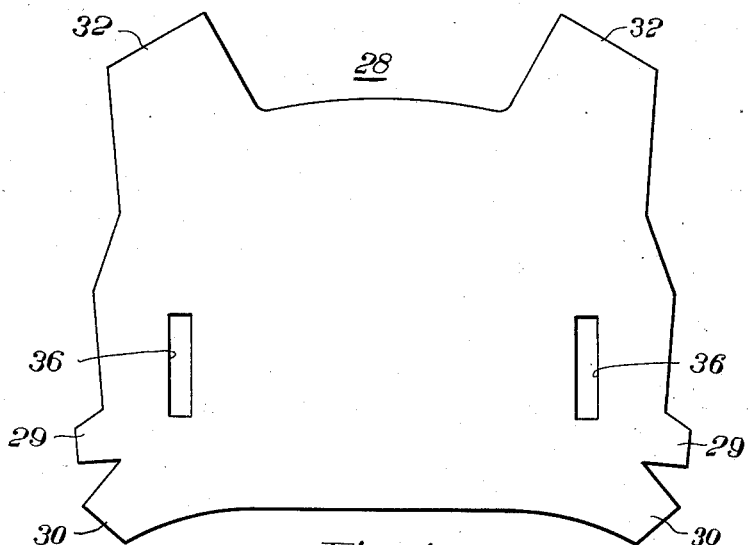
Fig. 4.
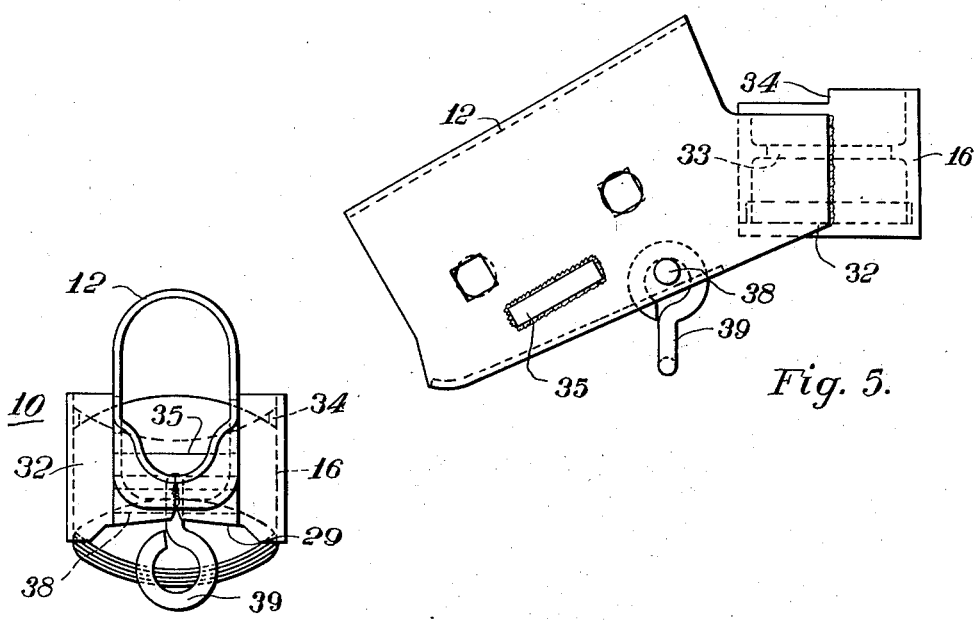
Fig. 5.
Fig. 6.
WITNESSES:
Edward Michaels
G. V. Giolma
INVENTOR
Joshua Morris, Jr.
BY Geo. J. Crawford
ATTORNEY Patented Aug. 6, 1940

2,210,684

UNITED STATES PATENT OFFICE 2,210,684

CURRENT COLLECTING DEVICE

Joshua Morris, Jr., Pittsburgh, Pa., assignor to Westinghouse Electric & Manufacturing Company, East Pittsburgh, Pa., a corporation of Pennsylvania Application September 30, 1938, Serial No. 232,689

10 Claims. (Cl. 191—59.1)

My invention relates generally to current collecting devices, and it has reference, in particular, to a trolley pole head for an electrically operated vehicle.

The object of my invention, generally stated, is to provide a strong and durable trolley pole head for electric trolley buses, which shall be of simple construction and economical to manufacture and maintain in operation.

A more specific object of my invention is to provide for mounting a current collector shoe on a trolley pole head in such manner that the shoe is biased to substantially the normal operating position and is rotatable about a horizontal axis, whereby the shoe, upon engaging an obstruction, may rotate to clear itself from the obstruction and automatically return to the normal operating position.

A further object of my invention is to provide a current collecting trolley pole head having a renewable collector shoe so mounted therein that the frictional engagement between the collector shoe and the trolley wire assists in maintaining equal contact pressures along the contact surface therebetween, and the collector shoe is rotatable through a substantial angle about a horizontal axis for clearing overhead obstructions.

Another object of my invention is to provide a trolley bus pole head having a collector shoe rotatably positioned in a harp with the center of rotation thereof located substantially below the line of contact between the collector shoe and the trolley wire, and adjacent to the trailing end of the collector shoe.

A still further object of my invention is to provide a trolley pole head comprising a fabricated body member for supporting a rotatable harp in which the collector shoe may be rotatably mounted so as to present a contour substantially continuous with that of the trolley pole and harp, and reduce the damage to overhead structures upon dewirements of the collector shoe.

Yet another object of my invention is to provide a trolley pole head having a normally horizontal current collector shoe which is rotatable through a substantial angle about a horizontal axis adjacent to the trailing end of the shoe for clearing overhead obstructions, and is provided with retrieving means for returning the shoe to substantially the normal operating position upon clearing the obstruction.

Other objects will, in part, be obvious and will, in part, appear hereinafter.

In practicing a preferred form of my invention, the trolley pole head may comprise a body member adapted to be mounted upon a trolley pole or an extension thereof, and which may be fabricated from sheet metal of any suitable nature, and a bearing structure which may be formed integral therewith in any suitable manner, such as by welding. A harp may be rotatably supported by the bearing structure, for facilitating the mounting of a current collector shoe which may be so secured therein as to be rotatable through a substantial angle about a horizontal axis located below the line of contact between the shoe and the wire. Under normal operating conditions, the frictional engagement between the collector shoe and the trolley wire may thus be utilized for exerting a force tending to elevate the leading end of the collector shoe, which force may be substantially balanced against the weight of the leading portion of the trolley shoe, so that the actual contact pressure between the collector shoe and the trolley wire is substantially equal at all points along the contact surface. The trolley shoe being rotatable through a substantial angle about the horizontal axis will, therefore, be free to rotate thereabout so as to assume a position wherein it presents a contour substantially continuous with that of the harp, and clear obstructions, such as supporting wires, when the collector shoe may become accidentally dewired. In order to facilitate replacement of the collector shoe upon the trolley wire after a dewirement, means such as a spring may be provided for retrieving the collector shoe and returning it to substantially the normal operating position upon clearing such obstructions.

For a more complete understanding of the nature and scope of my invention, reference may be had to the following detailed description, taken in connection with the accompanying drawings, in which:

Fig. 4 illustrates a preferred form of body member punching for the pole head of Figs. 1 and 2;

Fig. 5 is a side elevation view showing the method of assembly of the body member and bearing structure in a preferred form of pole head; and Fig. 6 is an end elevation view of the assembly of Fig. 5.

Figure 1:
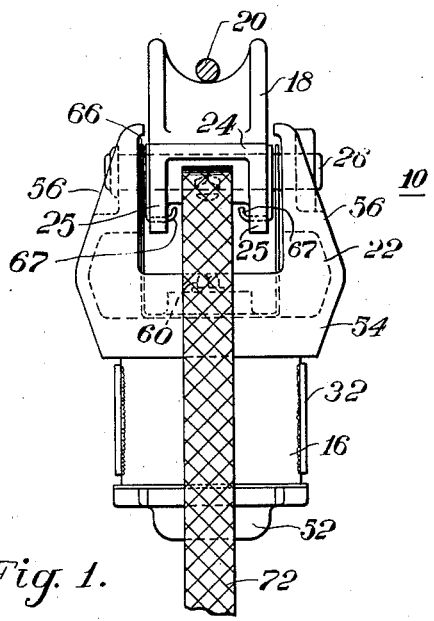
Figure 1 is an end elevation view of a trolley pole head embodying a preferred form of my invention.
Figure 2:
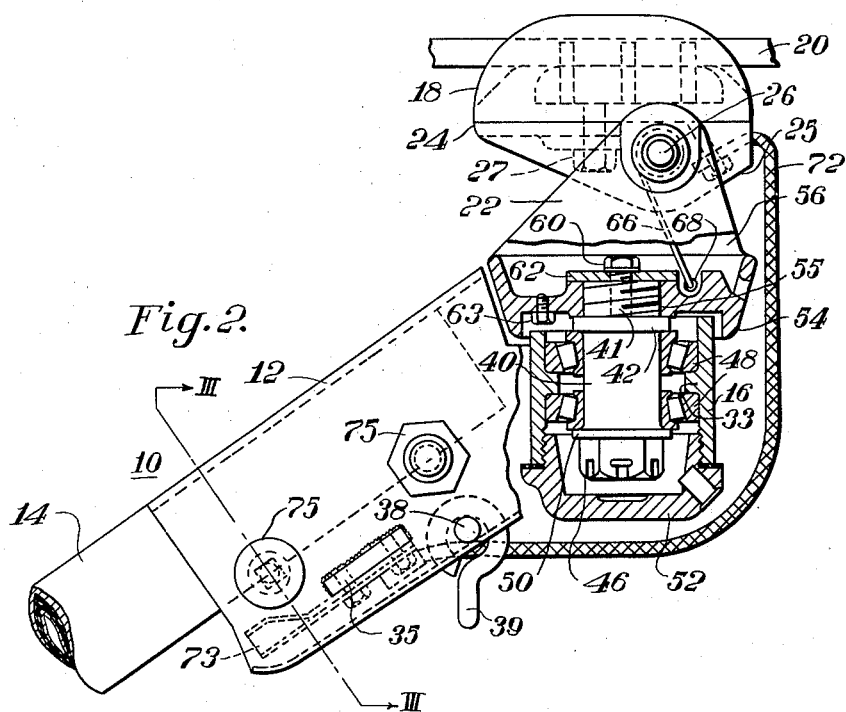
Fig. 2 is a view partly in section and partly in side elevation of the pole head of Fig. 1.

Referring particularly to Figs. 1 and 2, the reference numeral 10 denotes generally a trolley pole head which may comprise a body member 12, which is disposed to be mounted upon a trolley pole or pole extension 14 of an electrically operated vehicle (not shown), and a bearing structure 16, adapted to be secured to the body member in any desirable manner, such as by welding it thereto. In order to support a current collector shoe 18 for engaging a trolley wire 20, a harp 22 may be mounted in the bearing structure 16 so as to be rotatable about a substantially vertical axis, and a collector shoe support 24, having a substantially flat upper surface, and downwardly depending sides 25 may be positioned therein in any suitable manner. As shown in Figs. 1 and 2 of the drawings, the support plate 24 is preferably mounted in the harp upon a transverse horizontal shaft 26 so as to have such a degree of freedom of rotation thereabout that when the collector shoe 18 is removably secured thereto, by means such as a bolt 27 passing through the support plate and threaded into the collector shoe 18, the collector shoe and support plate may rotate about the shaft 26 so that the lower edge of the support plate is substantially in line with the leading edge of the harp, thus presenting a continuous surface which will not snag the support wires, etc., upon a dewirement of the collector shoe.

Referring to Figs. 4, 5, and 6 of the drawings, it may be seen that in a preferred embodiment of the invention, the body member 12 may comprise a sheet metal stamping 28 having, for example, a shape such as illustrated generally in Fig. 4. By any suitable operation, the stamping 28 may be formed about its axis of symmetry so that the extending ears 29 and 30, at each side of one end thereof, meet on the under side, where they may be secured together, preferably by welding, so as to provide a hollow longitudinal body member 12 for accommodating the trolley pole extension 14, and having extending ears 32 at the other end for engaging the bearing structure 16.

In order to facilitate manufacture of the trolley pole head, the bearing structure 16 may be made from any suitable material, such, for example, as a suitable length of tubing, provided with a centrally disposed interior bearing flange 33, the purpose of which will be explained later, and threaded internally at the lower end. A portion of the upper edge of the bearing structure may be cut away, so as to provide upstanding shoulders 34, as shown in Fig. 5, which may be utilized in limiting the degree of rotation of the harp about its vertical axis. As illustrated in Figs. 5 and 6, the bearing structure 16 may be secured to the body member 12 in any suitable manner, such as by forming the ears 32 to conform generally with the shape of the bearing structure and welding them thereto. A terminal plate 35 may be provided for facilitating the making of electrical connections to the collector shoe by inserting a suitable length of strap into openings 36 in the body member, and welding it thereto. A pin 38 may likewise be secured to the body member for positioning a link 39, to which a rope (not shown) may be attached for manipulating the trolley pole and pole head.

Referring again to Figs. 1 and 2, it may be seen that in order to rotatably mount the harp 22 in the bearing structure 16, a stem member 40 may be provided, having an extension 41 at its upper end for engaging the harp 22, a shoulder 42 located adjacent thereto, and a threaded portion at the lower end for receiving a nut 46. Suitable bearing means, such as the roller bearings 48, which are adapted to be positioned within the bearing structure 16 on either side of the bearing flange 33, may be provided for facilitating the rotation of the stem member 40. By positioning the roller bearings 48 in the bearing structure 16 and inserting the stem member 40 therethrough, with the flange 42 upwards, placing a washer 50 on the threaded lower end of the stem and drawing it up against the lower roller bearing 48 by means of the nut 46, the stem 40 may be secured in the bearing structure so as to require a minimum of effort to effect rotation thereof. A bearing cap 52, provided with a lubricating fitting 54 of any suitable nature, for facilitating lubrication of the bearings 48, may be inserted in the threaded end of the bearing structure 16 to seal the structure against the entrance of dirt and moisture.

The harp 22 may be attached to the extension 41 of the stem in any suitable manner to provide a rigid connection therebetween. In this instance, the extension 41 is threaded and the harp 22 comprises a base member 54, provided with a suitable threaded opening 55 for receiving the extension 41, and upstanding side portions 56 which have backwardly sloping front edges. The harp may then be positioned on the stem extension 41 and locked thereto by any suitable means, such as the tap bolt 60, which may, for example, be threaded into the extension 41 so as to draw a washer 62 against the base 54 of the harp, to force it against the shoulder 42. A suitable stop 63 may be provided for limiting the rotation of the harp, by positioning a screw or rivet in the base of the harp so that the head thereof engages the shoulder portions 34 of the bearing structure when the harp has rotated through the desired angle.

In order to facilitate the mounting of the collector shoe 18 so that it may have a substantial degree of freedom of rotation about a horizontal axis, the support plate 24 may be provided with a transverse opening adjacent to the trailing or rear end of the plate, and the upstanding side portions 56 of the harp may be provided with oppositely disposed transverse openings therein, for receiving the transverse shaft 26. The location of these openings is such that when the collector plate 24 is positioned in operating relation with the harp 22 by the shaft 26, the collector shoe 18 and the support plate 14, to which it is secured, may rotate through such an angle that the lower edge of the support plate forms substantially a smooth continuation of the leading edge of the harp. The possibility of the pole head damaging overhead support wires, etc., upon a dewirement of the collector shoe is thereby greatly reduced.

As the collector shoe 18 and plate 24 are free to rotate about the shaft 26 through a substantial angle, suitable means, such as the coil spring 66, may be provided in association with the support plate 24 and the harp 22 for biasing the collector shoe to substantially the normal operating position when free, and effecting the return of the collector shoe to substantially the normal operating position after it may have been rotated about the shaft 26 in clearing some overhead obstruction. For example, the spring 66 may be coiled about the shaft 26 at each side of the support plate 24 with the free ends 67 thereof engaging the downwardly depending sides 25 of the support plate, and the central portion positioned in a groove 68 in the base of the harp. The collector shoe 18, being secured to the support plate 24 by the bolt 27 which passes through the support plate and is threaded into the collector shoe, is thereby provided with a good mechanical and electrical connection thereto. A shunt member 72 may be provided for connecting the support plate 24 to the terminal plate 35 on the body member 12, and suitable connection made thereto by means of a terminal 73, so as to provide a good electrical connection between the collector shoe 18 and the body member 12, thus eliminating the necessity for conducting current between any of the moving parts of the supporting structure.

Figure 3:
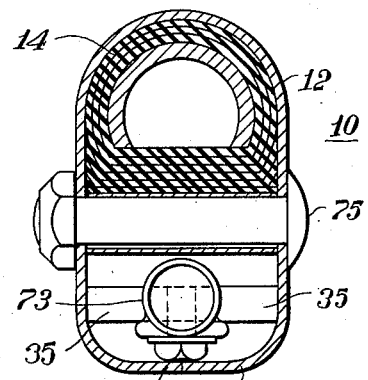
Fig. 3 is an enlarged cross-section view along the line III—III of Fig. 2.

As shown in Fig. 3, the pole head may be removably secured to the trolley pole extension 14 by bolts 75 which pass transversely through the body member 12 and engage in interlocking relation with the extension.

It may be seen, therefore, from the above description, taken in connection with the accompanying drawings, that I have provided a trolley pole head which may be simply and economically manufactured, and which is light in weight and of a durable construction. The life of the collector shoe 18 may attain a maximum, as by utilizing the frictional engagement between the collector shoe and the trolley wire to balance the weight of the offcenter portion of the shoe. To obtain substantially equal contact pressures between the collector shoe and the wire along the entire contact surface, the wear on the shoe is thereby distributed and made more even. By providing for rotation of the collector shoe about its horizontal axis, the shoe may readily clear itself from overhead obstructions upon the occurrence of a dewirement, thus reducing the hazard of damaging the overhead system, and by providing retrieving means for quickly effecting the return of the collector shoe to the normal operating position after dewirement, it may be easily replaced on the trolley wire in a minimum of time.

Since certain changes may be made in the above construction, and different embodiments of the invention may be made without departing from the spirit thereof, it is intended that all matter contained in the above description, and shown in the accompanying drawings, shall be considered as illustrative and not in a limiting sense.

I claim as my invention:

1. A device for collecting current from a trolley wire comprising, a body member adapted to be secured to a trolley pole, a harp rotatably supported thereby, a current collecting shoe pivotally supported by the harp for engaging the trolley wire in a normal operating position, said shoe being free for rotation about a horizontal axis for clearing an obstruction, and means for returning the shoe to the normal operating position after clearing said obstruction.

2. A current collecting device for an electric vehicle comprising, a body member head disposed to be secured to a trolley pole, a harp rotatably supported thereby, a current collecting shoe pivotally positioned in the harp about an axis adjacent to one end thereof for engaging a trolley wire in a normal operating position and disposed to rotate about said axis to clear obstructions upon dewirement of the shoe, and means including a spring member associated with the shoe and the harp for retrieving the shoe to the normal operating position upon clearing the obstruction.

3. A current collecting device for an electric vehicle comprising, a body member disposed to be secured to a trolley pole, a harp rotatably mounted thereon, a current collecting shoe for engaging a trolley wire pivotally supported in the harp about a horizontal axis adjacent to the trailing end of the shoe and below the line contact between the shoe and the wire for utilizing the frictional resistance between the shoe and the wire to maintain substantially equal contact pressures along the contact surface between the shoe and the wire in the normal operating position, said shoe being free to rotate through a substantial angle about said axis upon encountering an obstruction, and means for retrieving the shoe when free of the wire to the normal operating position subsequent to such rotation.

4. A device for collecting current from a trolley wire comprising, a body member adapted to be detachably secured to a trolley pole, a rotatable harp supported thereby, a current collecting shoe having a longitudinal groove in one side for normally engaging a trolley wire, a support plate for positioning the collector shoe in the harp, said plate being pivotally mounted in the harp and rotatable about a horizontal axis adjacent to the trailing end thereof, a spring member associated with the support plate for returning the collector and support plate to the normal position subsequent to such rotation, and shunt means for connecting the support plate to the pole head.

5. A current collecting device for an electric vehicle comprising, a body member adapted to be secured to a trolley pole, a stem member supported thereby for rotation about a vertical axis, a harp secured to the stem, a support plate pivotally supported by the harp on an axis adjacent to one end of the plate, a collector shoe secured to the support plate for normally engaging a trolley wire, said support plate being rotatable through substantially 180° about said axis to allow the shoe to clear obstructions upon a dewirement thereof, and means for retrieving the shoe to substantially a normal position subsequent to a dewirement.

6. A current collecting device for an electric vehicle comprising, a pressed steel body member disposed to be removably secured to a trolley pole, a tubular bearing member integrated with the pole head by welding, a harp rotatably supported by the bearing member for rotation about a vertical axis, a current collecting shoe supported by the harp for movement about a horizontal axis adjacent to one end of the shoe for engaging a trolley wire, said shoe being capable of rotation from the normal position upon striking an obstruction, and spring means for returning the shoe to the normal position upon clearing the obstruction.

7. A device for collecting current for an electric vehicle comprising, a body member of pressed construction disposed to be secured to a trolley pole, a tubular bearing member integrated therewith by welding, a rotatable stem supported by the bearing member, a harp secured to the stem, a support plate positioned in the harp for rotation about a horizontal axis adjacent to the trailing end, a current collecting shoe secured to the support plate for normally engaging a trolley wire, said shoe and plate being rotatable about the horizontal axis to clear obstructions upon a dewirement of the collector shoe, and means associated with the support plate for retrieving the collector shoe to substantially the normal position after clearing the obstruction.

8. A current collecting device for an electric vehicle comprising, a body member adapted to be removably secured to a trolley pole, a trolley harp rotatably mounted on the body member, means integral with the body member for limiting the degree of rotation of the harp, a support plate rotatably supported by the harp for movement about a transverse axis adjacent to the trailing end of the plate, a collector shoe removably secured to the plate for normally engaging a trolley wire, said plate being adapted to rotate about said axis through substantially 180° for permitting the collector shoe to clear obstructions upon dewirement, a resilient member for returning the collector shoe to substantially a normal position upon clearing the obstruction, and flexible shunt means connecting the support plate to the pole head.

9. A current collecting device for an electric vehicle comprising, a body member of pressed steel having a tubular bearing member integrated therewith by welding, a harp supported by the bearing member for rotation about a vertical axis, a support plate mounted in the harp for oscillation about a horizontal axis adjacent to the trailing end thereof, a current collecting shoe having a longitudinal groove on one face for normally engaging a trolley wire detachably secured to the support plate and rotatable therewith about the horizontal axis upon encountering an obstruction, a flexible shunt member connecting the support plate and the pole head, and spring means for returning the collector shoe to the normal position upon clearing an obstruction.

10. A current collecting device for an electric vehicle comprising, a body member disposed to be removably secured to a trolley pole, a harp member supported thereby for rotation about a vertical axis, a support plate having a substantially flat upper face positioned in the harp for limited rotational movement about a horizontal axis adjacent to the trailing end, a current collector shoe mounted on the support plate with the horizontal axis of rotation thereof adjacent to the trailing edge of the shoe so that the leading edge of the shoe will be free to rotate about the horizontal axis of the support plate upon encountering an obstruction, a flexible shunt for connecting the support plate and the pole head to provide a fixed current path, and spring means biasing the current collector shoe and support plate to a current collecting position.

JOSHUA MORRIS, Jr.